United States Patent [19]

Christman

[11] Patent Number: 5,984,362
[45] Date of Patent: Nov. 16, 1999

[54] TWO-BOOK MAP VOLUME

[76] Inventor: Edwin Roy Christman, 2 Bay Shore Dr., Greenland, N.H. 03840

[21] Appl. No.: 09/041,942
[22] Filed: Mar. 13, 1998
[51] Int. Cl.[6] ................................................... G09B 29/00
[52] U.S. Cl. .............................................. 283/34; 283/35
[58] Field of Search ................................ 283/34, 35, 61, 283/62; 281/2, 5; 434/130, 150, 153

[56] References Cited

U.S. PATENT DOCUMENTS

| 891,272 | 6/1908 | Loewe | 283/34 |
|---|---|---|---|
| 1,537,634 | 5/1925 | Watson | 283/42 |
| 2,316,786 | 4/1943 | Gottlieb | 283/34 X |
| 2,486,502 | 11/1949 | Spafford | 283/34 X |
| 2,693,648 | 11/1954 | Anderson | 35/42 |
| 2,889,638 | 6/1959 | Anderson | 35/42 |
| 3,738,686 | 6/1973 | Morse | 283/63 |
| 4,030,218 | 6/1977 | Stockwell | 40/102 |
| 4,289,333 | 9/1981 | Gaetano | 283/35 |
| 4,348,038 | 9/1982 | Lynch | 283/34 |
| 4,934,741 | 6/1990 | Landry | 283/34 |
| 4,937,572 | 6/1990 | Yamada | 340/995 |
| 5,030,117 | 7/1991 | Delorme | 434/130 |
| 5,160,170 | 11/1992 | Ferra | 283/34 X |
| 5,419,586 | 5/1995 | Golson | 283/34 |
| 5,472,239 | 12/1995 | Trujillo | 283/34 |

OTHER PUBLICATIONS

Map#1, 1997, Pocket Atlas, Arrow Map, (Small Pocket Book), Article #1, 1987 Map Projections, U.S. Gov.
Map#2, 1996, N.H. Atlas & Gazetter, (Large Magazine) Article #2, 1987, Maps for America, U.S. Gov.
Map#3, 1994, N.H. Road & Recreational Guide, (Folded Map), Article#3, 1994, Compresive Guide to Land Navigation, Alexs.

Primary Examiner—Willmon Fridie, Jr.

[57] ABSTRACT

An improved volume of map, chart, or large image data, constructed of two complimentary books in which a comprehensive data region (10) is divided into a plurality of rectangular segments (22). The segments are separated into two groups as if a checkerboard pattern of alternating light and dark rectangles (34), (54) existed. The segments are further divided in half and made into facing pages or leaves (90), with each book (82), (86) containing generally half the sum of the data segments of the comprehensive map. The facing leaves are further ordered by two-dimensional coordinate based on row (98), and column (94) of the segments. The two-dimensional facing leave coordinate (130) is clearly printed on facing leaves.

An oversized cover (118) contains applicable coordinate scales or measure rules (110) on the inner sides of the visible area (122) of oversizement when the book is open. The scales are aligned to and applicable to the facing leaves. Leaves containing the detail segment data contain only data (106) extending to the leave edges and the facing leave coordinate reference. Both books contain a key map (102) of the comprehensive data with a checkerboard tinted grid overlay (114) matching the segments to indicate which book the segment is in. It also displays the two-dimensional coordinates of the facing leaves within each grid or by column and row on outer scales. Leaves are ordered within each book in a row and column manner. Both books also contain comprehensive indexes which reference points of interest by the two-dimensional facing leave coordinate indicating segment or facing leaves address and then an additional two-dimensional coordinate for location on the facing leaves.

6 Claims, 9 Drawing Sheets

Total Comprehensive Map, Chart, Image data

Segments Grouped by Checkerboard color and ordered by Row/Column

Segments divided equally and made into facing pages

Adjacency in Top & Bottom Orientations

Book 1

Book 2

Adjacency in Side by Side Orientations

Key Map in Side by Side Orientations

Two books folded within each other

Opened book with oversized cover used for grid or measure on all sides

Opened book with oversized cover that is flush on bottom

TWO-BOOK MAP VOLUME

BACKGROUND

1. Field of Invention

This invention relates to cartographic and large image printing and publishing in book form, specifically the need to view adjacent data leaves in a side by side, panoramic manner with two-dimensional navigation and geographic positioning.

2. Description of Prior Art

Map, chart, or image data such as satellite photography, unlike text, is typically reproduced on comparatively large stock whether in book, sheet, or folded sheet form. This is primarily because visual information has no beginning or end. It contains a middle only in a geometric sense. The way one views such data is both unpredictable and random. The viewer typically has a single point of high interest with interest declining to low based inversely on the distance from that point. This creates a primary region of interest, highest at the single point and then diminishing in all directions from the point. In cases of navigation between two points, similar logic applies to the line or course between those points rather than a single point.

Books, in any form or binding, have been used mostly to include a collection of independently produced maps. The leaves of books being comparatively smaller than large sheet maps impair use if the point of interest is positioned not toward the middle of the leave but towards an edge. The region of interest often extends onto two leaves. When the point of interest is near a leave edge the user desires to view two or more leaves within the book simultaneously, which cannot be done.

In single books, facing leaves some times offer adjacent map information. Pocket Atlas—METRO BOSTON—Eastern Massachusetts, Arrow Map, Inc., Bridgewater, Mass., 1997, demonstrates a single book with facing leaves containing adjacent map data in its book and no attempt is made to indicate true geographical position information. A key map is provided on a single leave with a uniform grid of the area and the segments equate to leaves within the book. Leaves are ordered numerically and serially by row/column and no logical or intuitive relationship exists between these leave numbers and adjacent leave data except that the leave to the left or right may be at a number of one higher or lower than the current leave number.

The street/town index for these leaves lists an alpha sequence character representing an up/down orientation and a numeric sequence number representing a sideways orientation and the numeric leave number. Both are needed because the alpha/numeric reference has no relationship to leave number. The alpha/numeric reference indicates in x-axis/y-axis coordinate terms where on the leave a point of interest exists as if the key map was a large wall map rather than a book with leaves. An individual leave therefore might have coordinate scales that begin with P and end with T while the numbers start with 15 and end with 26. The letters and numbers themselves do not indicate a specific location relative to the leaves. The letters and numbers on each of the leave scales are always different.

Reference or navigation is primarily by town name and street name via indexes printed at the end of the book. A specific leave reference number is printed toward the outer edges of each leave indicating where the adjacent data for that edge is located within the same book. Without such reference, there would be no way to find the adjacent data without returning to the key map.

In another conventional approach, NEW HAMPSHIRE ATLAS & GAZETTEER, Tenth Edition, DeLorme, Freeport, Me., 1996, the key map with grid by uniform geographical size is placed on the back cover and on the inside cover for the entire area covered by the book. Facing leaves consist of adjacent map data and a marginal, consistent amount of map data overlap exists on the outer leave edges. This redundant data makes the book larger but affords the user some continuity when the point of interest is close to the edge. If this point is close to the edge on one leave, it will also be close to the edge on an adjacent leave. The user is still unsatisfied viewing either leave individually.

If one places two copies of this publication side by side with adjacent data across leaves in order to gain a near seamless, panoramic view, one would still be frustrated. Now the map data overlap on individual leaves is a visual impairment rather than an asset. This redundant data, coupled with alpha/numeric coordinate scales along the outer edges and white outer collar or margin space, makes using two books compiled in such a manner (and not in the two-book map volume manner) non-functional. A true geographic location number is fine printed on the four outer corners of facing leaves but the geographical referencing method is independent of and not related to the key map, indexes, or leave coordinate scales.

The town/street index is improved in that the x-y coordinate system scale, imprinted on the leaves, references a location on the leave rather than a non-existent larger wall map. Unlike the previous example, all leaves contain the same scales with numbers starting at the beginning number one and letters with beginning character A. This enables a more intuitive and cognitive means of leave navigation. One can presume, for instance, a reference with a low number and character to always be in the same general place on the leave, such as the upper left corner.

The key map grid is again ordered numerically however, thus it suffers the disadvantages of the previous book. Detail map data leaves begin with the number 18 and end at 53 because this publisher chose to include 17 pages of other data ahead of the detail map leaves within its book. This illustrates more clearly that one cannot logically process such a number to find adjacent data or any data. One still cannot view the key map leave and the detail data leaves at the same time or be assured of a panoramic view of a particular region of interest.

Folded maps, such as New Hampshire Road & Recreation Guide, Arrow, Map Inc., Taunton, Mass., 1994, offer the user the advantage of both detailed and incrementally larger panoramic views simultaneously, as it is unfolded. They are also analogous to paper napkins in that they will last forever as long as you do not use them. Paper, once folded, does not unfold well thus impeding use as well as useful life. Numerous patents such as U.S. Pat. No. 4,289,333 to Gaetano (1979) attempt to improve upon the method of folding. All accept the limitations of folded paper and that the map information is limited by the practical constraints of maximum sheet size. It is additionally impractical to maintain view of accurate position information. The outer edges of the sheet, where such grid scales are printed, are not visible if used in a mostly folded manner.

Unfolded or wall maps are expensive to produce and distribute because of their size. They usually require a special costly container tube if the user wishes to store or transport them. Multiple unfolded maps require even more costly maintenance in the form of special purpose cabinetry. Unfolded maps are appropriate for permanent locations such as walls or special map rooms but have limited field or every day utility.

Additional approaches attempt to provide a book with foldout leaves or single books with pivots that allow leaves to fanout such as U.S. Pat. No. 4,030,218 to Stockwell (1977). Stockwell provides increased ability to view adjacent leaves but failed to point out that in one in four cases it does not provide such function because one of the adjacent data segments is physically on the back of the leave being viewed. Another approach, U.S. Pat. No. 5,419,586 to Golson (1995) recognizes the value of viewing the key map and detail data leaves at the same time by providing a fold out panel as a front cover within a single book. Still others view the computer as the source of all improvement to map, chart, and large image viewing such as U.S. Pat. No. 5,030,117 to DeLorme (1991).

OBJECTS AND ADVANTAGES

The objectives are to provide a superior yet easy to learn, intuitive, means for viewing cartographic or image data in a particular two book form rather than sheet form or single book form.

In so doing the user benefits as follows:

(a) Provides improved viewing from single book style format. The user can position the two books in any side by side configuration and achieve a panoramic view of adjacent map data as if they were facing pages or leaves. A specific point of interest that is positioned close the outer edge of any leave can now be centered across two leaves. The region of interest can be more fully viewed simultaneously.

(b) Provides improved convenience of use as duplicate key map and index data can be printed in both books thus allowing the user to always see key map or indexes, and detail map data at the same time.

(c) Provides improved ease of use as user can continue in any direction intuitively because the map leaves adjacent to the current facing leaves are always in the other book. They are also quick and easy to locate without any reference to adjacent map data printed on the map data leaves.

(d) Provides for scalability where critical or cost effective. The user can use two or more sets of the same two-book volume to provide an even larger viewing area including map leaves that are cater-corner to the current leaves. A user might chose to use two smaller size books because they fit properly in a backpack, brief case, or bookshelf, rather than one larger book.

(e) Provides for reduced visual clutter and map complexities as no references, scales, adjacent data leave numbers, or geological position data need be printed on the data leaves. Desired leaves or points of interest can be referenced from the key map or index areas, or the oversized cover area, of the other book simultaneously. The leave coordinate reference is the only required element to be printed on the leave other than the data itself.

(f) Provides for optimization of map data with minimum amount of pre-publishing complexity, paper, or other material. There is no requirement for map data overlap on leaves, grid scale, or extra collar space. Additional navigation information such as adjacent leave reference number is no longer needed or desirable. An oversized cover with grid scale or measure aligned to the data leaves accommodates those applications where such functions are desirable.

(g) Provides professional level map solutions that require less space and do not require special cabinets or tubes. Map collections can be stored on a bookshelf or standard filing cabinet.

(h) Provides for improved and even smaller pocket size book implementations where moving from leave to leave increases in importance and frequency. A major disadvantage of pocket size books is not being able to see or center the region of interest because it falls on two different leaves. This disadvantage is eliminated. Finding the adjacent leave is also quick, intuitive, and easy, without a printed reference on the leaves or key map.

(i) Provides for universal approach that is:
  (1) leave size independent,
  (2) suitable for map, chart, or image data,
  (3) applicable to wide range of use types including aviation, road, boating, and recreation,
  (4) compatible with any paper stock, binding method, or cover type.

(j) Provides for more up to date data by reducing time and cost of data updating.

(k) Provides for reduced production, distribution, and inventory costs by manufacturer.

(l) Provides for individual leaves to be updated within a book and for manufacturer to produce and ship updates at lower costs than replacing entire chart or map.

(m) Provides for inexpensive magazine or staple type binding up through approaches that are more durable.

(n) Provides superior convenience and portability by eliminating need for a special container tube yet avoids the complications and disadvantages of folded paper.

(o) Provides superior functionality for complimenting other $20^{th}$ and $21^{st}$ century technological advances such as computers, wireless telephones, satellite global positioning beacons, hand held receivers of satellite position data, and automated vehicle navigation systems.

(p) Facilitates the publishing of true geographically based cartographic material that can be used for actual ground reference.

Further objects and advantages and numerous adaptations of the two-book map volume will appear from the following detailed description taken in connection with accompanying drawings.

DRAWING FIGURES

Figure 1:
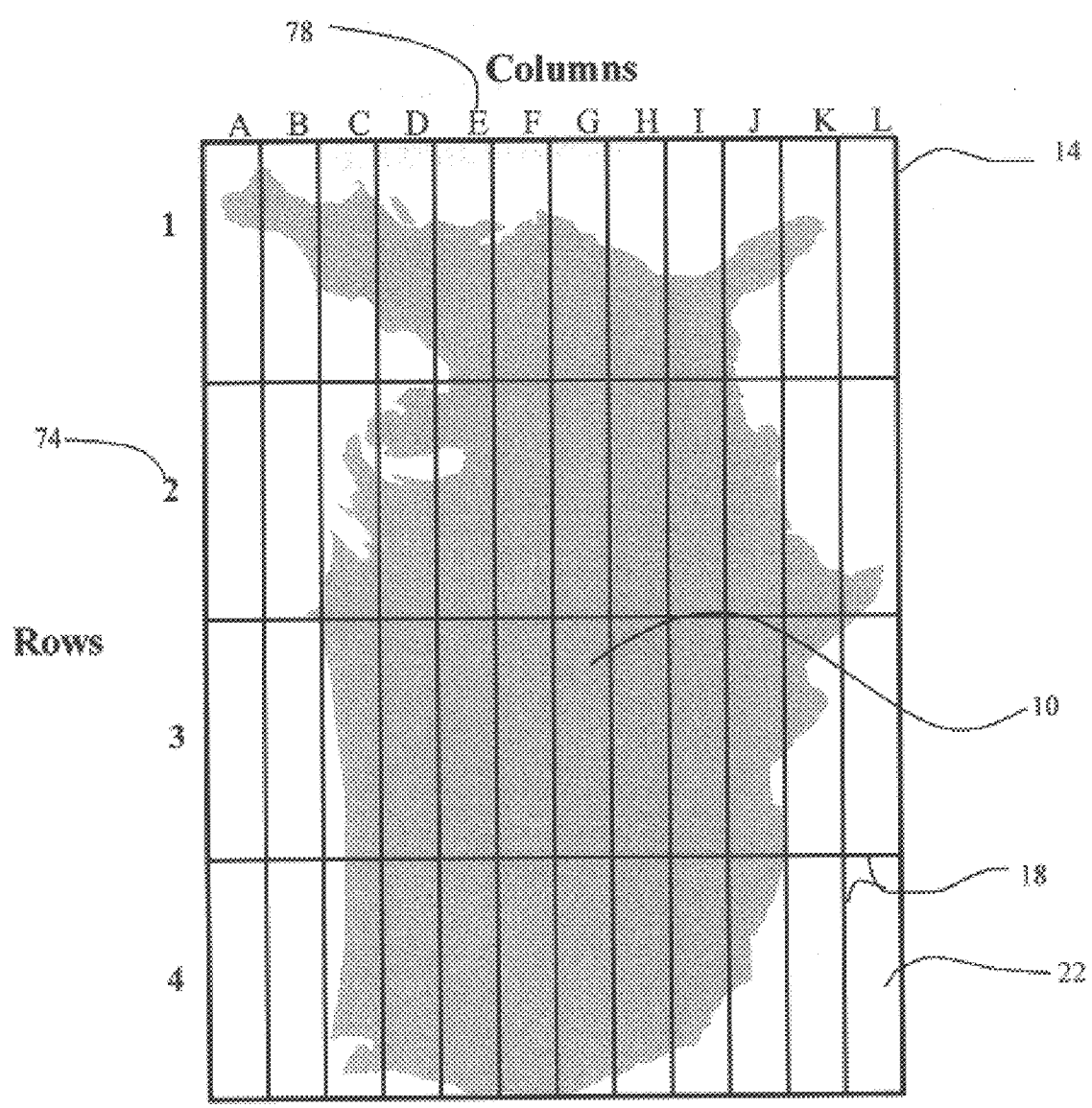
FIG. 1 illustrates comprehensive map data included in inventors' two-book volume. It is projected on flat surface and subdivided into rows and columns of rectangular segments.

REFERENCE NUMERALS IN DRAWINGS 10 large comprehensive cartographic or image data
14 flat surface
18 horizontal and vertical lines
22 individual rectangular segment
26 light colored segment
30 dark colored segment
34 light segment adjacent to four dark segments
38 dark segment 1 adjacent to light segment 34
42 dark segment 2 adjacent to light segment 34
46 dark segment 3 adjacent to light segment 34
50 dark segment 4 adjacent to light segment 34
54 dark segment adjacent to four light segments
58 light segment 1 adjacent to dark segment 54
62 light segment 2 adjacent to dark segment 54
66 light segment 3 adjacent to dark segment 54
70 light segment 4 adjacent to dark segment 54
74 segment row index
78 segment column index
82 book 1
86 book 2
90 leave or page
94 facing leaves column index
98 facing leaves row index
102 key map or small scale map or comprehensive area
106 detail data or large scale data
110 grid scale or measure rule
114 grid lines on data leave
118 oversized cover
122 oversized outer edge area of inner cover
126 outer edge of leave
130 facing leaves coordinate reference code
134 leaves flush with cover on bottom edge

SUMMARY OF THE INVENTION

The two-book map volume, in a preferred embodiment, accomplishes the foregoing objects for a comprehensive map, chart, or large image region, by providing a two book volume. Each book contains generally half the data. The two-book map volume provides a universal advancement that applies using any binding type, leave material, size, cover, coating, or printing method. The particular ordering of segments into two books provides first that the leaves containing adjacent data to those being viewed will be contained in the other book in all cases. The data is also accessible to the user in a friendly, easy to understand and use, manner. The page numbering system designed for textbooks is abandoned. In its place is a two-dimensional, facing leaves, coordinate infrastructure for books that facilitates moving from leave to leave and also provides a structural relationship with real world two-dimensional geographical positioning and navigation technique.

Additionally, improvements provide for unique oversized cover design that cost effectively enables books to cleanly adjoin each other in any vertical or horizontal configuration. The cover now also contains the coordinate scales and measures no longer printed on the leaves.

The most significant improvement comes from the ability of the user to achieve a near seamless panoramic view of adjacent data across the two books when they are placed in any side by side configuration and opened to facing leaves of adjacent data.

DESCRIPTION

Referring now to the drawings, like reference numerals are used to designate like parts throughout the several views.

Figure 2:
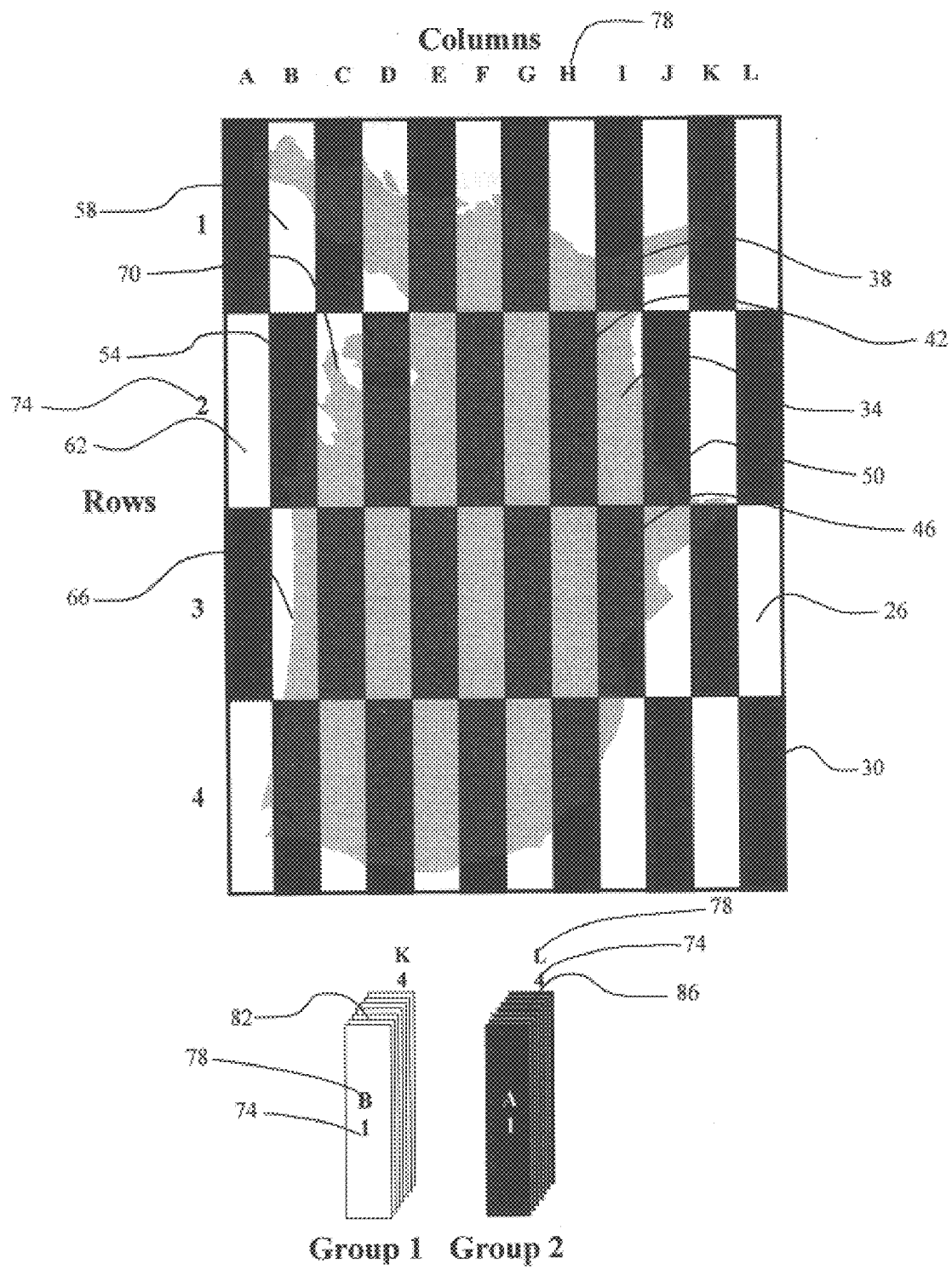
FIG. 2 illustrates how the total data of FIG. 1 is further coded using a checkerboard type pattern method and separated into two groups ordered by row/column reference.

There is shown in FIG. 1 cartographic data of a large contiguous region designated 10, projected onto a flat surface 14 and subdivided with horizontal and vertical lines 18 forming a plurality of individual rectangular segments 22. Those segments that contain data will become two facing leaves within one of the two books of this two-book map volume. FIG. 2, to illustrate the theory of organization, shows an equivalent flat surface of same subdivision and colored in such manner as to make half the segments light 26 and half the segments dark 30 creating a checkerboard pattern. The segments can also be referenced by a two dimensional coordinate system based on row numbers 74 and column letters 78. One can observe from specific segment (I2) 34, a light segment, that all adjacent segments (I1) 38, (H2) 42, (I3) 46, and (J2) 50 are of dark color. Demonstrating the reverse, specific segment (B2) 54, a dark segment, is adjacent to all light segments (B1) 58, (A2) 62, (B3) 66, (C1) 70. It also illustrates that the segments will be grouped by their checkerboard color and further by segment row 74 and column 78.

Figure 3:
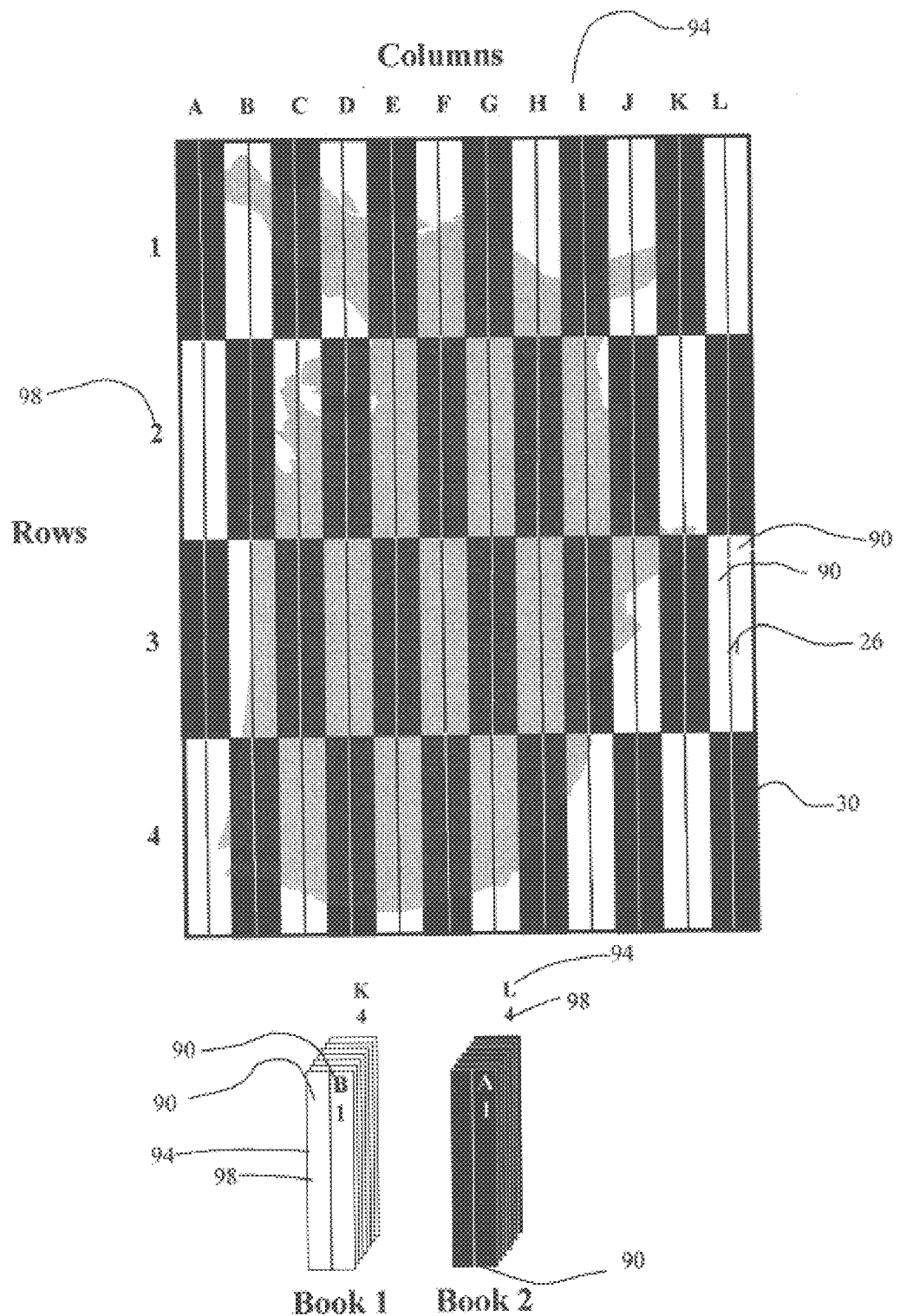
FIG. 3 illustrates how the coded segments are further subdivided equally and formed into leaves of two books. It also illustrates one form of row/column segment indexing.

FIG. 3 discloses how each now colored segment is further divided in half forming the map data for each individual leave and the particular order of leaves within two complimentary books. Facing leaves Row 98 and column 94 coordinates are used in order to illustrate physical order of leaves within book-1 82 containing all the ordered light leaves and book-2 86 containing all dark leaves. The sum of segments first grouped by color to form two books 82, 86 is then ordered by leave column and row within each book. Throughout both books, a consistent placement of even and odd numbered leaves is maintained with the odd numbered leaves on the left and the even numbered leaves on the right as an observer faces an open book. Occasionally, a leave may be left blank or otherwise used if that half segment contains no map data. Only segments where at least one leave contains data would be included in a book. The leave sequence order illustrated in FIG. 3 within book-1 82 would be B-1, D-1, F-1, H-1, J-1, L-1, A2, C2,...,I-4, K-4. The leave sequence order within book-2 would be A-1, C-1, E-1, G-1, I-1, K-1, B2, D2, . . . , J-4, L-4. Each leave would be so marked. A user, when paging through each book from front to back would quickly observe both the letter and number incrementally increasing and thus a quickly learned intuitive method exists for locating leaves within each book.

Figure 4:
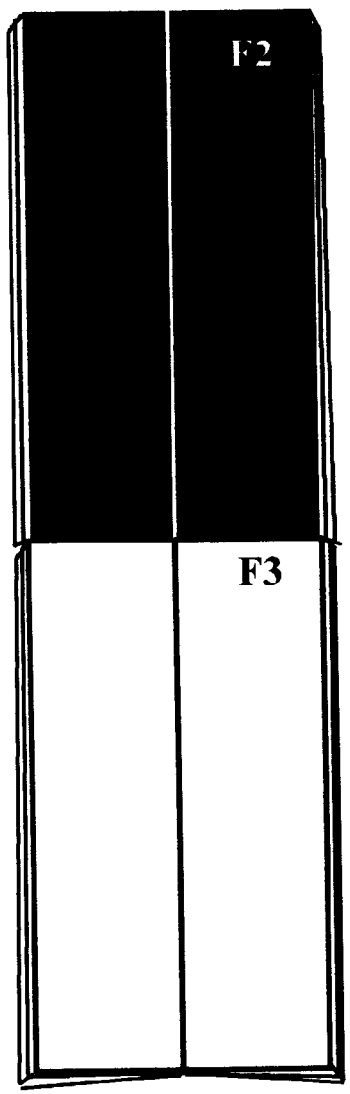
FIG. 4 illustrates an opened book 1 aligned above an opened book 2 and positioned to display adjacent map data across books.
Figure 5:
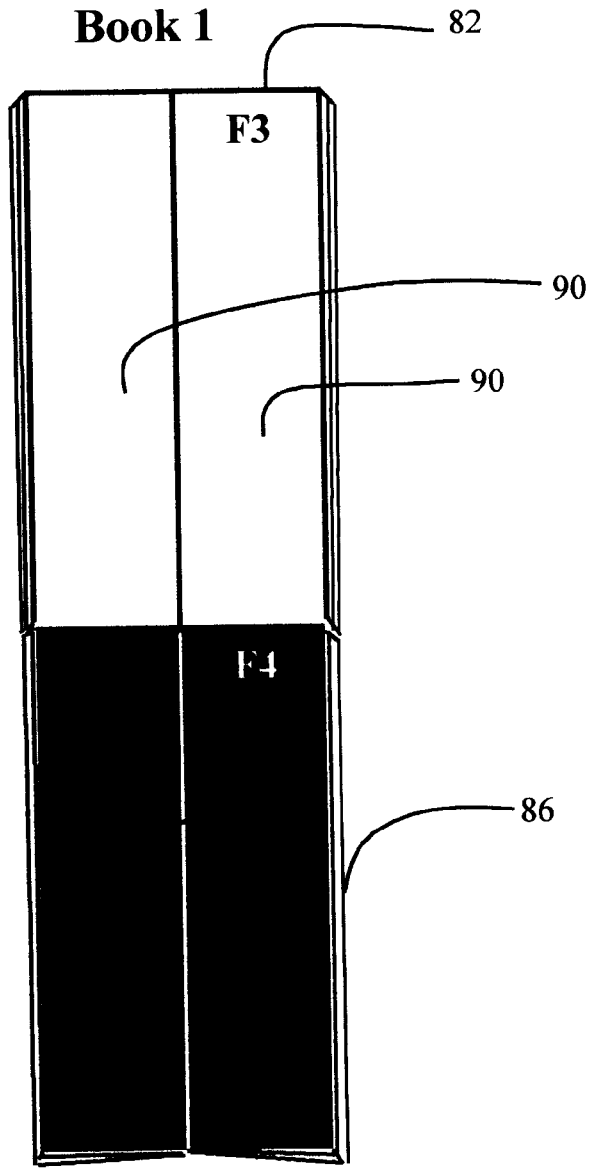
FIG. 5 illustrates same opened book 1 aligned below opened book 2 and positioned to display adjacent map data across books.

An important part of the two-book map volume is that in absolutely all cases, the leaves adjacent to the opened leaves of one book must be in other book and thus available for viewing in a side by side manner. FIGS. 4, 5, 6, 7, serve to illustrate how the checkerboard pattern grouping provides the superior leave adjacency when applied to two-book form. FIG. 4 and FIG. 5 illustrate how the two books 82, 86 can be opened utilizing the same column letters 94 and row numbers 98 as in FIG. 3. Book-1 82 is first positioned beneath book-2 in FIG. 4 and then above book-2 in FIG. 5.

Figure 6:
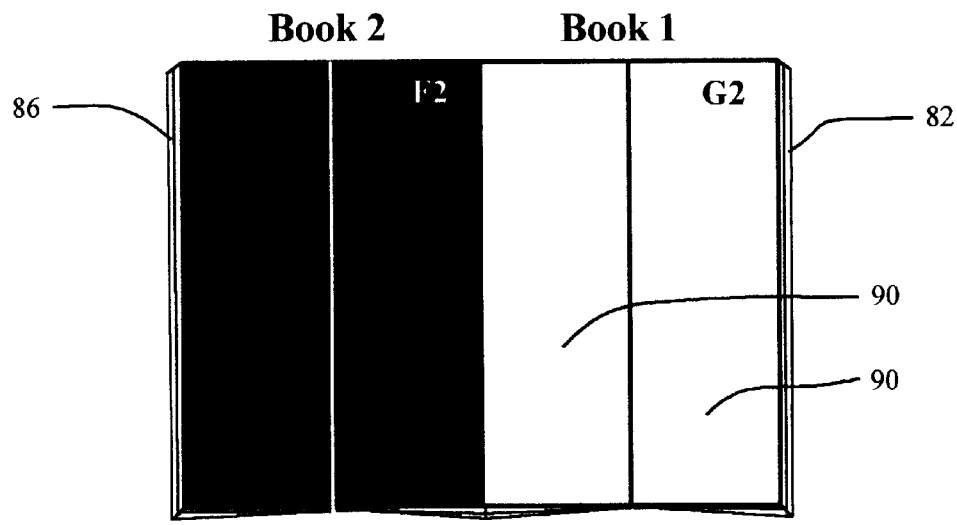
FIG. 6 illustrates same book 1 aligned to the left side of same opened book 2 and positioned to display adjacent map data across books.
Figure 7:
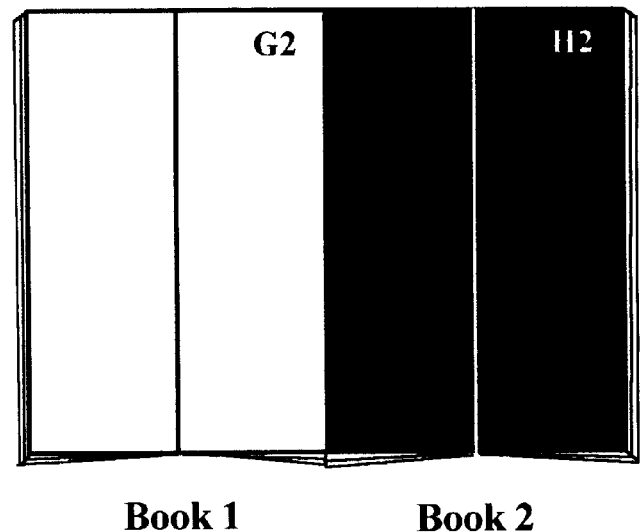
FIG. 7 illustrates same book 1 aligned to the right side of same opened book 2 and positioned to display adjacent map data across books.

FIGS. 6 and 7 illustrate similar adjacent functionality with the books positioned side by side. In FIG. 6 book-1 82 is positioned on the right of book-2 86 and in FIG. 7 book-1 82 is on the left of book-2. In this orientation, both books would be opened to the same row numbers but successive columns letters. The leave row/column references 94 98 further illustrate how easy it becomes to find the leaves within the book without any index, printed reference, or other help. The leave above E-3 is E-2 or one number lower. The leave to the right of F-3 is G-3 or one letter higher. If the user is on the A row they would know they are at the highest level and recognizing a 1(one) would indicate the very first column on the left. The key map would indicate the last row and column values for the right and bottom of the comprehensive data. It would also become obvious to the user when the column or row does not exist because it would be a higher value than those alpha and numeric values available within the books.

Figure 8:
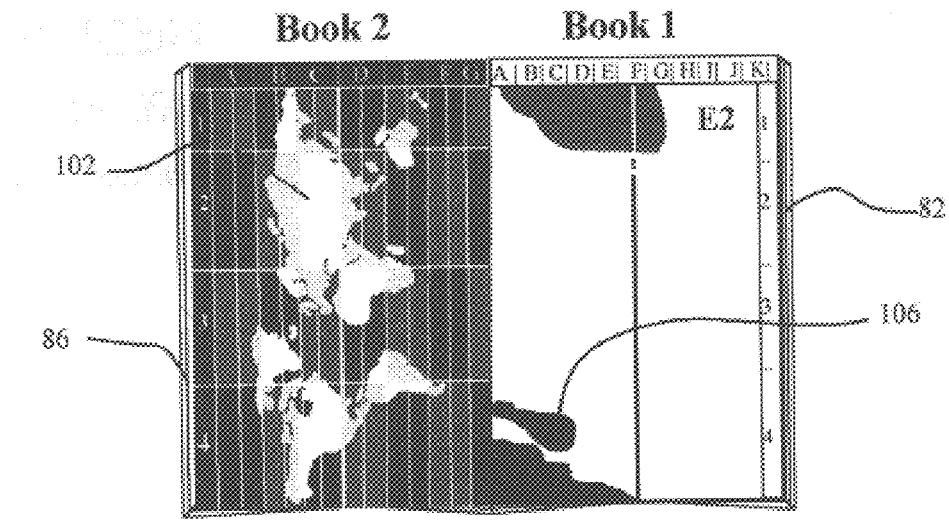
FIG. 8 illustrates one form of book 1 opened to key map and book 2 opened to detail map data.
Figure 9:
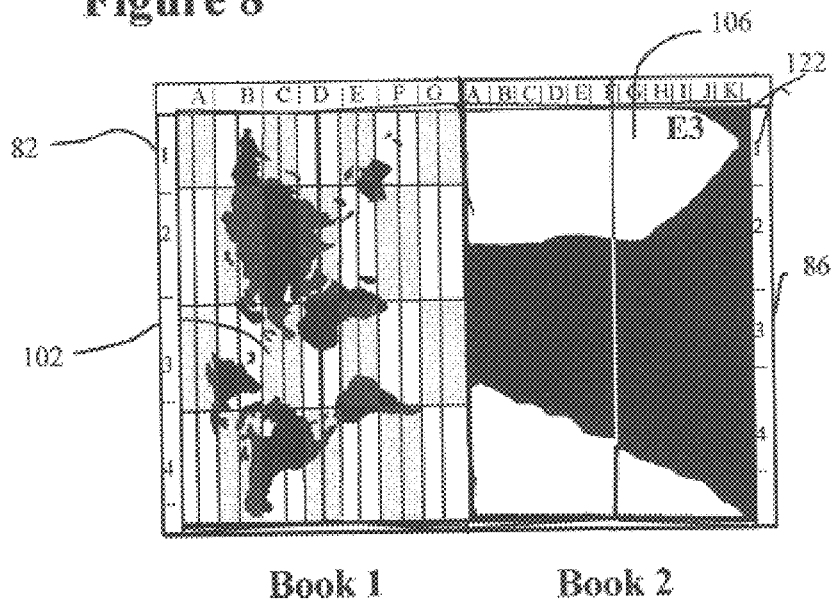
FIG. 9 illustrates one form of book 2 opened to key map and book 1 opened to detail map data.

FIG. 8 details book-2 86 with open key map and positioned next to book-1 82 with open detail map data. FIG. 9 represents book-1 82 with open key map and book-2 86 with open detail data. In this case, the physical positioning next to each other is less significant. It is a desirable facility in many cases where application use, by one person, requires iteration between views of large-scale and small-scale map data. A user could conceivably view a detail map 106 of book-1 82 while someone else in a different physical location is either viewing book-2 86 for detail map data 106 or using the key map 102 or index information. Such might be the case within an automobile, boat, or airplane where more than one person assists in navigation or data review. It is also less significant where in the other book the key map is placed or whether it exists on one or two leaves. In all cases, one can view the detail data and key map 102 at the same time.

Figure 10:
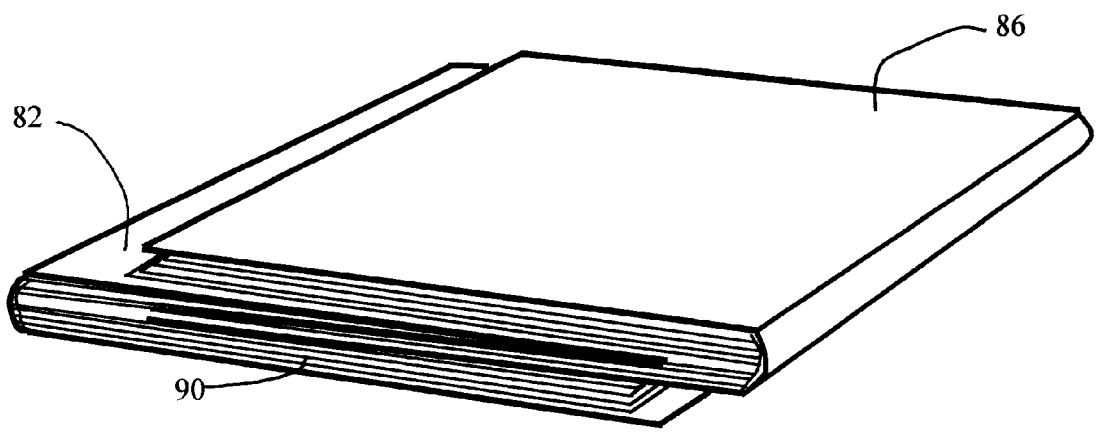
FIG. 10 illustrates of one form of two books folded together for storage.

A likely basic implementation would incorporate the key map on the front or back cover for ease of use or marketing purposes. The two-book map volume enables many derivatives for more specific product applications. FIG. 10 illustrates a basic method of keeping the two books together in a boat, automobile, backpack, or cabinet drawer. More advanced application might include a portfolio type cover on one book to envelop the other, or weatherproof case for both books.

Figure 11:
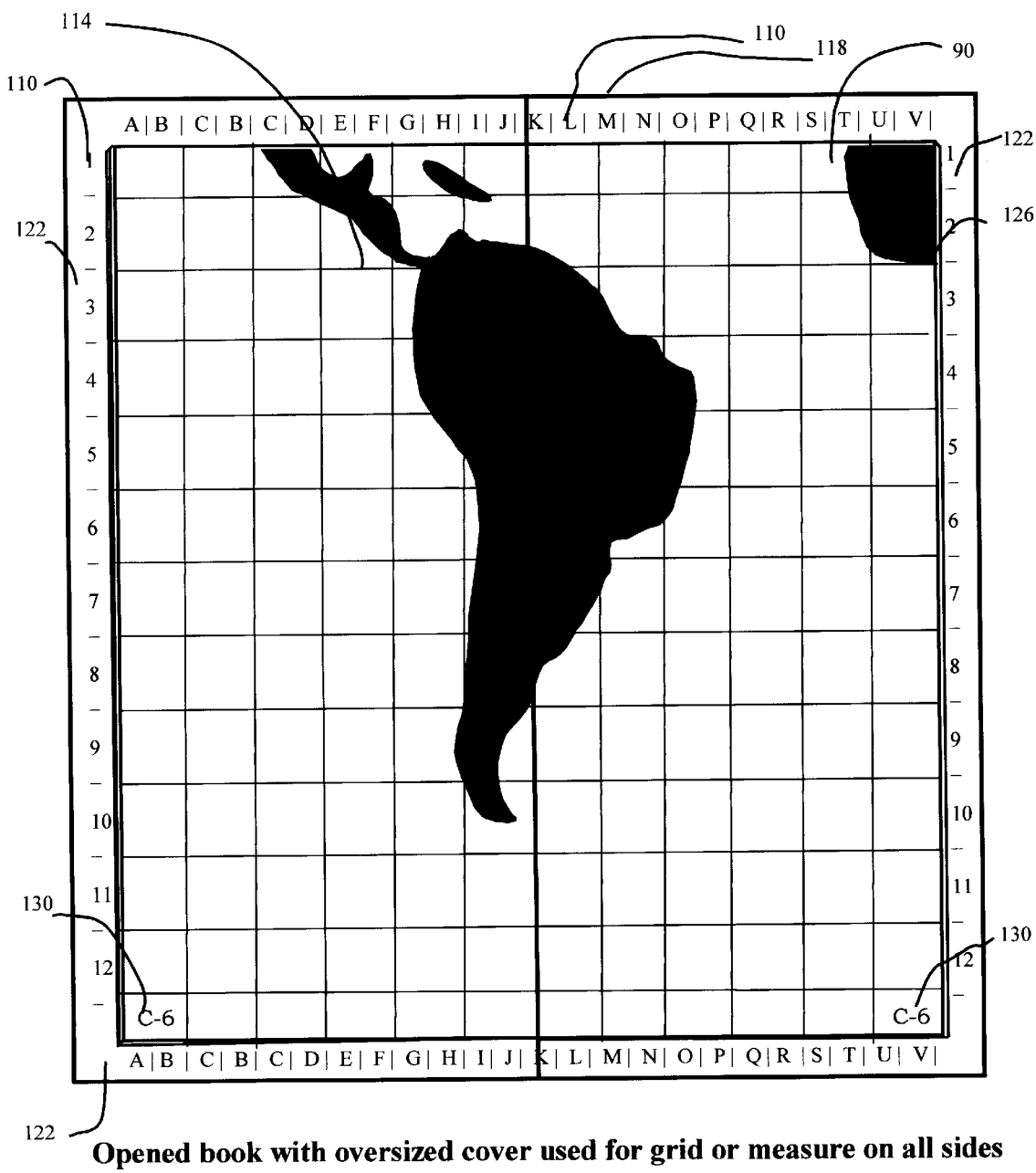
FIG. 11 illustrates one form of using inside area of oversized cover for displaying grid scales or measures instead of on detail data leaves.

Another significant component of the two-book map volume is the implementation of a special oversized cover 118 when compared to the leave size. FIG. 11 illustrates such a cover in basic form. The oversized cover 118 allows the data leaves 90 to contain only data and no margin, coordinate marking or scales. Grid lines 114 may appear on the data if appropriate. Only the facing leaves coordinate 130 need appear. On the oversized outer edge area 122 of the inner side of the front and back cover 118, a permanent set of grid scales or measures 110 are imprinted. The grid scales or measure rules 110 on the inner cover 122 align to the data leaves and function as if they were printed on the leaves 90.

The oversized cover 118 of this design adds significant utility and can be used even in single book map applications as it is optimally efficient, with little or no paper waste, added size, or bulk. It simplifies pre-publishing complexity and thus encourages the updating of data and the addition of true geographic correctness. It is a near essential component of the two-book map volume because it is highly desirable to position the two books so that the leaves are flush against each other when viewing in a side by side manner. If there were grid marks, scales, rules, or other data along the outer edges of the leaves, panoramic viewing and adjacency would be significantly impaired. The use of the oversized cover 118 in combination with the particular method of leave ordering by row and column eliminates the need for anything other than data 106 on the data leaves 90 other than the facing leaves coordinate reference code 130.

Figure 12:
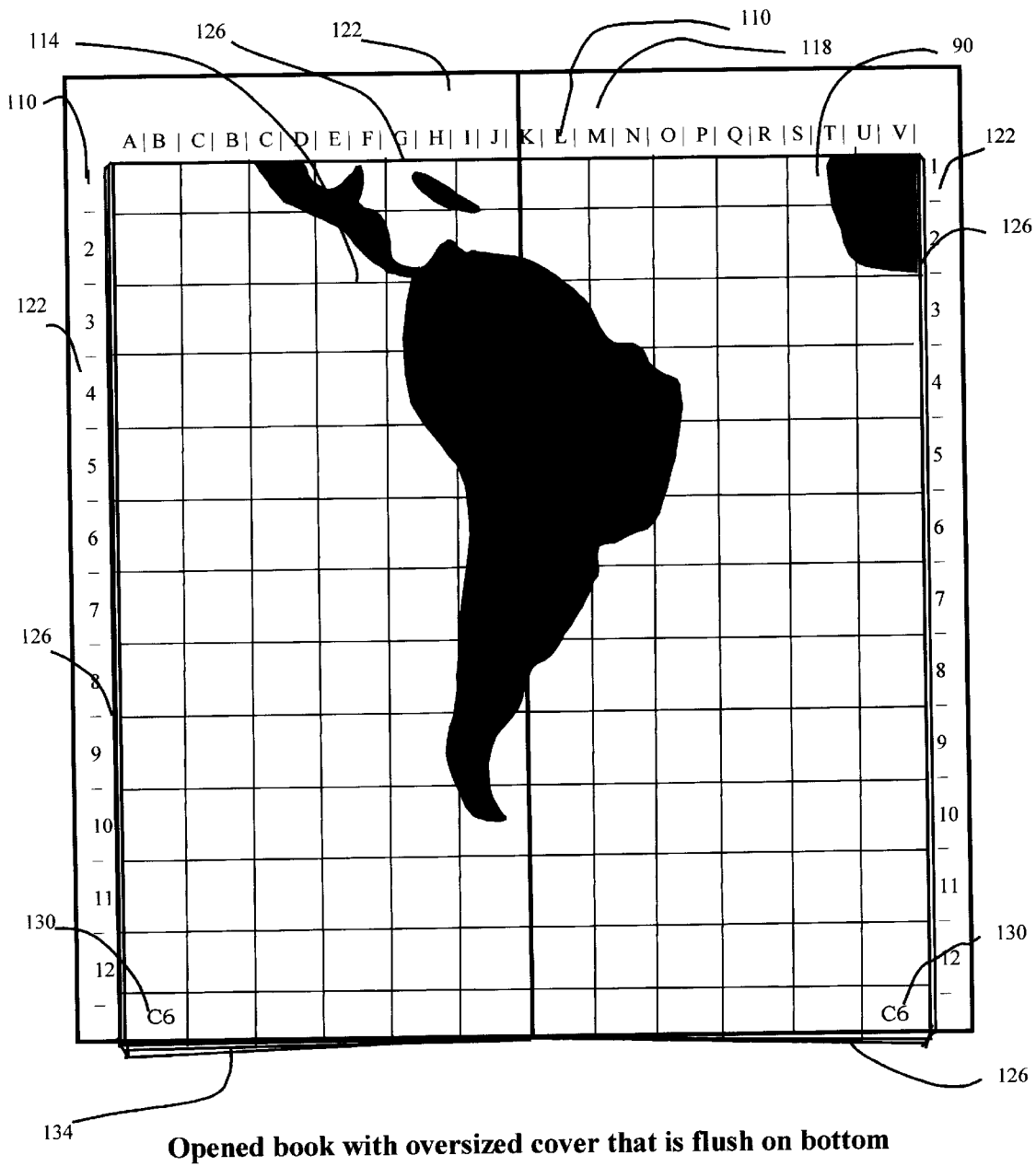
FIG. 12 illustrates another form of using inside area of oversized cover for displaying grid scales or measures instead of on detail data leave.

FIG. 12 illustrates the preferred embodiment of an oversized cover 118 suitable for general purpose and universal application. The bottom edge of the leaves and the bottom edge of the cover 118 are flush 134 for both books. The inner cover oversizement occurs only on the top and outer sides. The user loses the ability to visually locate data by referencing a bottom scale but can still use the scale 110 on the top area 118 of the cover. The flush bottom 134 provides a significant advantage. It allows the leaves of two books to be easily positioned against each other, leave edge to leave edge 126. One can now easily place the flush bottom end 134 of one book over the top cover area of oversizement 122 of the other when attempting to achieve the adjacency described in FIGS. 4 and 5. This allows the two covers to overlap each other by just the amount of the area of oversizement 122 on the top. The viewer can hold each outside corner to maintain adjacency when viewing if a stiff cover material is used or overall size is small such as pocket size maps.

In geologically based maps where the location on the map has an accurate and direct relationship with its location on earth, or other object, the two-book map volume advances the state of art. The larger comprehensive data is in essence divided into perfect frames of the whole. Scale and direction are perfectly maintained. When traveling, one can achieve a continuous panoramic view by preparing the inactive book with the next map. The next map leave is determined by first observing the edge to which the direction of travel is approaching. Second, the facing leaves coordinate is incremented by one value in the direction of travel. Third, one indexes through the ordered leaves to the new facing leaves coordinate in the other book. Each leave could additionally contain geographical position coordinates with the inner cover containing geographically true scales or rules matching known global coordinate systems.

The use of dual two-dimensional coordinates provides needed simplicity and certainty. For example, the town/street index would now refer to a street location at: J-4 D-2. This, when decoded, means a point on facing leaves J-4 with an x-axis y-axis location of D-2 found using the coordinate scales on the cover. Multiple scales can optionally exist on both key map and the cover allowing the user to quickly convert a global position system reading into the simpler dual coordinate system of the books. The dual two-dimensional coordinate infrastructure frees the viewer to move in any direction. Unlike a textbook that is numbered serially and allows linear movement only from the front to back the user can now move around randomly from book to book.

The cover designs of FIG. 11 or FIG. 12 can be embellished to include latching devices to allow the books to be temporarily fastened. The cover could also be implemented with fold out panels to achieve oversizement or for additional stability when using two books. A fold out panel could also contain additional alternate rules or scales. Cover design could include an external folder on one book for which the other books cover could slide into thereby temporarily joining the two for storage or limited use.

The embodiment of the two-book map volume shown in the drawings is for illustrative purposes only. The drawings and the accompanying specification are not to be construed as a definition of the limits or scope of the two-book map volume, reference being had to the appended claims for that purpose.

I claim:

1. A two book map volume of comprehensive cartographic or image data comprising:
   (a) comprehensive data comprising segments formed rows and columns of smaller rectangles of data,
   (b) said rows and columns separated in two groups as if said segments were tiles in checkerboard-like pattern of alternating colors,
   (c) said two groups form two books such that said segments each fill combined a viewing surface of two adjoining leaves when said book is open between them and each said book consisting of substantially half the sum of said rows and columns,
   (d) whereby said two books can be opened and placed in juxtaposition in any top, bottom, or side configuration and display a seamless panoramic view of adjacent segments of said cartographic or image data across said books.

2. The two book map volume of claim 1 and limitations thereof, wherein said segments within each book are ordered in a row and column scheme and coded as such within said segment area.

3. The two book map volume of claim 1 and claim 1 and limitations thereof wherein a key map showing said entire comprehensive cartographic or image data with grid markings showing segments with segment row and column indices.

4. The two book map volume of claim 1, claim 2, and claim 3 and limitations thereof wherein said key map is color coded or otherwise marked in a checkerboard-like manner to indicate which said book each said segment is in.

5. The two book map volume of claim 1 and limitations thereof wherein said books contain general, comprehensive, town, street, or other indices to said segments of said comprehensive data.

6. The two book map volume of claim 1 and limitations thereof wherein said book contains other data.

* * * * *